(12) United States Patent
Yonetani et al.

(10) Patent No.: US 6,728,058 B1
(45) Date of Patent: Apr. 27, 2004

(54) CASSETTE TAPE RECORDER

(75) Inventors: Naoki Yonetani, Daito (JP); Tetsuya Tani, Katano (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 408 days.

(21) Appl. No.: 09/651,089

(22) Filed: Aug. 30, 2000

(30) Foreign Application Priority Data

Aug. 31, 1999 (JP) .......................................... 11-246602

(51) Int. Cl.[7] .............................................. G11B 15/46
(52) U.S. Cl. ................................................... 360/73.08
(58) Field of Search ........................... 360/74.2, 73.08; 242/190, 187, 334.1–334.4; 318/7, 138, 254

(56) References Cited

U.S. PATENT DOCUMENTS

| | | | | |
|---|---|---|---|---|
| 4,731,679 A | * | 3/1988 | O'Gwynn et al. | 360/73.14 |
| 4,743,811 A | * | 5/1988 | Katayama | 360/73.08 |
| 4,786,992 A | * | 11/1988 | Tajima et al. | 242/334.4 |
| 5,039,027 A | * | 8/1991 | Yanagihara et al. | 242/334.2 |
| 5,248,112 A | * | 9/1993 | Rodal et al. | 242/334 |

FOREIGN PATENT DOCUMENTS

| | | |
|---|---|---|
| JP | 61-214192 | 9/1986 |
| JP | 62-66492  | 3/1987 |
| JP | 01-220248 | 9/1989 |
| JP | 03-003140 | 1/1991 |
| JP | 04-217887 | 8/1992 |

OTHER PUBLICATIONS

Copy of Japanese Patent Office Communication for corresponding Japanese Patent Application No. 11–246602 dated Dec. 2, 2004.

* cited by examiner

*Primary Examiner*—David Hudspeth
*Assistant Examiner*—K. Wong
(74) *Attorney, Agent, or Firm*—Armstrong, Kratz, Quintos, Hanson & Brooks, LLP

(57) ABSTRACT

In a cassette tape recorder for recording signals on a magnetic tape wound on a pair of reels of a tape cassette or reproducing signals from the tape, a control circuit for controlling a tape transport mechanism detects the amount of the tape remaining unwound and extending to the tape tail end, and controls the tape speed based on the tape position corresponding to the detected amount of the remaining tape. The control circuit estimates the thickness of the tape and alters the tape position where deceleration of the tape is to be started, in accordance with the estimated tape thickness. Consequently, even when the tape thickness varies from tape to tape, the time required for winding up the magnetic tape can be shortened by giving specified speed variations to the tape in the high-speed winding mode.

6 Claims, 11 Drawing Sheets

CASSETTE TAPE RECORDER

BACKGROUND OF THE INVENTION

1. Field of the Invention

The present invention relates to cassette tape recorders, such as video tape recorders and audio tape recorders, for recording signals on a magnetic tape wound on a pair of reels in a tape cassette or reproducing signals from the magnetic tape, and more particularly to a control system for moving the magnetic tape at a high speed and winding the tape on one of the reels.

2. Description of the Related Art

VTRs (video tape recorders) are conventionally settable in a fast-forward (FF) mode and rewinding (REW) mode. In these modes (hereinafter referred to as "high-speed winding mode"), the rotation of a capstan motor is delivered to the reel on the take-up side to transport the magnetic tape at a high speed. In recent years, a high-speed winding mode is realized in which the tape speed is 300 to 400 times the playback speed.

With reference to FIG. 10, provided in such a high-speed winding mode are an acceleration section R1, constant-speed section R2, deceleration section R3 and low-speed section R4, as arranged from a position where the tape is started for a high-speed movement to the tape tail end. In the constant-speed section R2, the capstan motor rotates at a maximum speed, giving a maximum tape speed Vm. The tape is thereafter wound to a predetermined tape position Pb, whereupon the tape starts to decelerate. The tape speed then decreases to a predetermined value Ve, whereupon the tape is brought into a slow-speed movement and wound up to the winding end.

The tape position Pb for the transition from the constant-speed section R2 to the deceleration section R3 is detected by a known method of detecting the remaining amount of the tape (see, for example, JP-A No. 81389/1990). Stated more specifically with reference to FIG. 11, suppose the radius of a magnetic tape 17 wound on a supply reel 15 of a cassette 1 is Rs, the radius of the tape 17 wound on a take-up reel 16 is Rt, and the radius of each of the supply reel 15 and the take-up reel 16 is r. It is possible to calculate from these values the area of the tape 17 wound on the supply reel 15, i.e., the area Ss between the circle with the radius r and the circle with the radius Rs, and the area of the tape 17 wound on the take-up reel 16, i.e., the area St between the circle with the radius r and the circle with the radius Rt. Further the radii Rs, Rt of the tape 17 on the respective reels can be calculated from the speed V of the tape 17 and the rotational periods Ts, Tt of the reels. The reel radius r and the tape speed V are known values.

For example, in the case where the tape is transported from the supply reel 15 to the take-up reel 16 and assuming that the tape 17 has an entire length Q, the amount Lm of the tape 17 remaining on the supply reel 15 can be calculated from the following mathematical expression.

$$Lm = Q \cdot Ss/(Ss+St)$$

However, the thickness of magnetic tapes for use in tape cassettes for conventional VTRs involves variations (e.g., 17 $\mu$m to 20 $\mu$m) due to the tolerance and difference of manufacturer, consequently impairing the accuracy in measuring the amount of remaining tape. Even if the tape is wound on the reel on the supply side over the same area Ss, the actual length of the tape portion providing the area is short when the tape has a large thickness, or is large when the tape has a small thickness.

In the case where the tape moving at the constant speed is decelerated as seen in FIG. 12 based on such inaccurate detection of the amount of remaining tape, there arises the problem that if the tape thickness is small, the actual deceleration starting position is shifted to a position Pb' from the intended tape position Pb toward the supply side, with the result that the length of the tape to be wound up to the tail end by the low-speed movement increases to a value R4' which is greater than the minimum length R4 required, necessitating a longer period of time for winding up the tape to the trailing end.

Alternatively if the tape has a large thickness, the actual deceleration starting position is shifted to a position Pb" from the contemplated tape position Pb toward the take-up side, with the result that the tape is wound up to its trailing end at a great speed Ve" during deceleration before the movement at the low speed Ve. This entails the likelihood that the resulting impact will damage the tape.

Further in the constant-speed section, the capstan motor is out of speed control, rotating at the greatest possible speed, so that differences in the magnitude of the load involved at this time produce variations in the tape speed. For example, in the case where the tape is moved at a constant speed Vm' which is less than the specified speed Vm as shown in FIG. 13 and if the tape is then brought into a decelerated movement at the predetermined tape position Pb, the low-speed section is subsequently reached earlier, with the result that the tape portion to be wound up by the low-speed movement has a length R4' which is greater than the minimum length R4 required, leading to the problem that the winding of the tape up to its trailing end requires a longer period of time.

The problems described above become more pronounced when the high-speed winding mode is realized at a tape speed at least 500 times the playback speed.

SUMMARY OF THE INVENTION

Accordingly, an object of the present invention is to shorten the time required for winding up a magnetic tape by giving specified speed variations to the tape in the high-speed winding mode even when the tape thickness varies from tape to tape.

The present invention provides a cassette tape recorder which comprises a tape transport mechanism for unwinding a magnetic tape from one of two reels (i.e., the reel on the supply side) and winding the tape on the other reel (on the take-up side), and a control circuit for controlling the operation of the tape transport mechanism. The control circuit comprises remainder detecting means for detecting the amount of the tape remaining unwound and extending to a tape trailing end, speed control means for controlling the speed of movement of the tape based on a tape position corresponding to the detected amount of the remaining tape to bring the tape into an accelerated movement, a constant-speed movement and a decelerated movement successively, and means for estimating the thickness of the tape. The speed control means comprises deceleration starting position adjusting means for altering the tape position where the deceleration of the tape is to be started, in accordance with the estimated thickness of the tape.

With the cassette tape recorder of the invention described above, the remainder detecting means calculates the amount of the remaining tape from the area Ss of a region positioned between and defined by the radially innermost circle of the tape as wound on the reel on the supply side and the radially outermost circle thereof, the area St of a region positioned between and defined by the radially innermost circle of the tape as wound on the reel on the take-up side and the radially outermost circle thereof and the overall length Q of the tape. The tape thickness estimating means calculates the thickness of the tape by dividing the combined area (Ss+St) of the tape wound on the two reels by the overall length Q of the tape. The deceleration starting position adjusting means alters the deceleration starting position toward a leading end of the tape when there is an increase in the estimated thickness of the tape.

For example, if the tape has a thickness greater than the standard value, the true amount of the remaining tape is less than the amount of the remaining tape detected by the remainder detecting means. The tape position (deceleration starting position) where the tape in the constant-speed movement is to be decelerated is therefore shifted toward the tape leading end, whereby the length of tape to be wound by the deceleration movement is adjusted to a predetermined value. Conversely, if the tape has a thickness less than the standard value, the true amount of the remaining tape is greater than the amount of the remaining tape detected by the remainder detecting means. The tape position (deceleration starting position) where the tape in the constant-speed movement is to be decelerated is therefore shifted toward the tape trailing end, whereby the length of tape to be wound by the deceleration movement is adjusted to the predetermined value.

Stated more specifically, the speed control means has a plurality of deceleration slopes which are different in deceleration starting position as speed varying reference curves prescribing the relationship between the tape position and the tape speed during deceleration. The speed control means selects one of the deceleration slopes in accordance with the estimated thickness of the tape, and controls the tape speed based on the selected deceleration slope. With this specific embodiment, the deceleration slopes are prepared in advance for different tape thicknesses, and one of these slopes is selected.

With the tape recorder thus constructed, the speed control means continues the constant-speed movement until the tape speed-position relationship prescribed by the selected deceleration slope is established before a change-over to the deceleration movement. When the tape speed decreases during the constant-speed movement, for example, under an increased load, the speed control means thus adapted continues the constant-speed movement even after the predetermined deceleration starting position is reached, and thereafter initiates deceleration in accordance with the selected deceleration slope when this slope is reached. Thus, deceleration is realized always in conformity with the selected slope regardless of the tape speed of the constant-speed movement.

Further stated more specifically, the speed control means comprises frequency dividing means for frequency-dividing FG pulses in synchronism with the rotation of a motor constituting the tape transport mechanism by N, means for setting the frequency dividing number N, period measuring means for measuring the period of frequency-divided pulses obtained by the frequency division, target period setting means for setting target values in succession for respective periods of frequency-divided pulses, and motor control means for preparing a control signal for the motor based on the deviation of the period measurement of frequency-divided pulses from the target value. At least when the period measurement of frequency-divided pulses is included within a predetermined range, the target period setting means alters an increase in the target period to thereby uniformalize the rate of variation with time of the tape speed during the deceleration movement every time processing is performed for setting the target period and preparing the control signal, whereby the tape is prevented from slackening during the deceleration movement.

Further stated more specifically, the frequency number setting means successively decreases the frequency dividing number N to determine one or a plurality of intermediate frequency dividing numbers and one final frequency dividing number, and frequency-divides the FG pulses by each intermediate frequency dividing number until the number reaches the final frequency dividing number. The period measuring means, the target period setting means and the motor control means execute the foregoing control at each intermediate frequency dividing number. This makes uniform the rate of variation of the tape speed with time from the start of deceleration until termination of deceleration, also realizing control based on the periods of frequency-divided pulses with ease and improved accuracy.

As described above, the cassette tape recorder of the present invention is adapted to shorten the time required for winding up the magnetic tape by providing specified speed variations to the tape in the high-speed winding mode even when the tape thickness varies from tape to tape.

DETAILED DESCRIPTION OF THE PREFERRED EMBODIMENT

Figure 1:
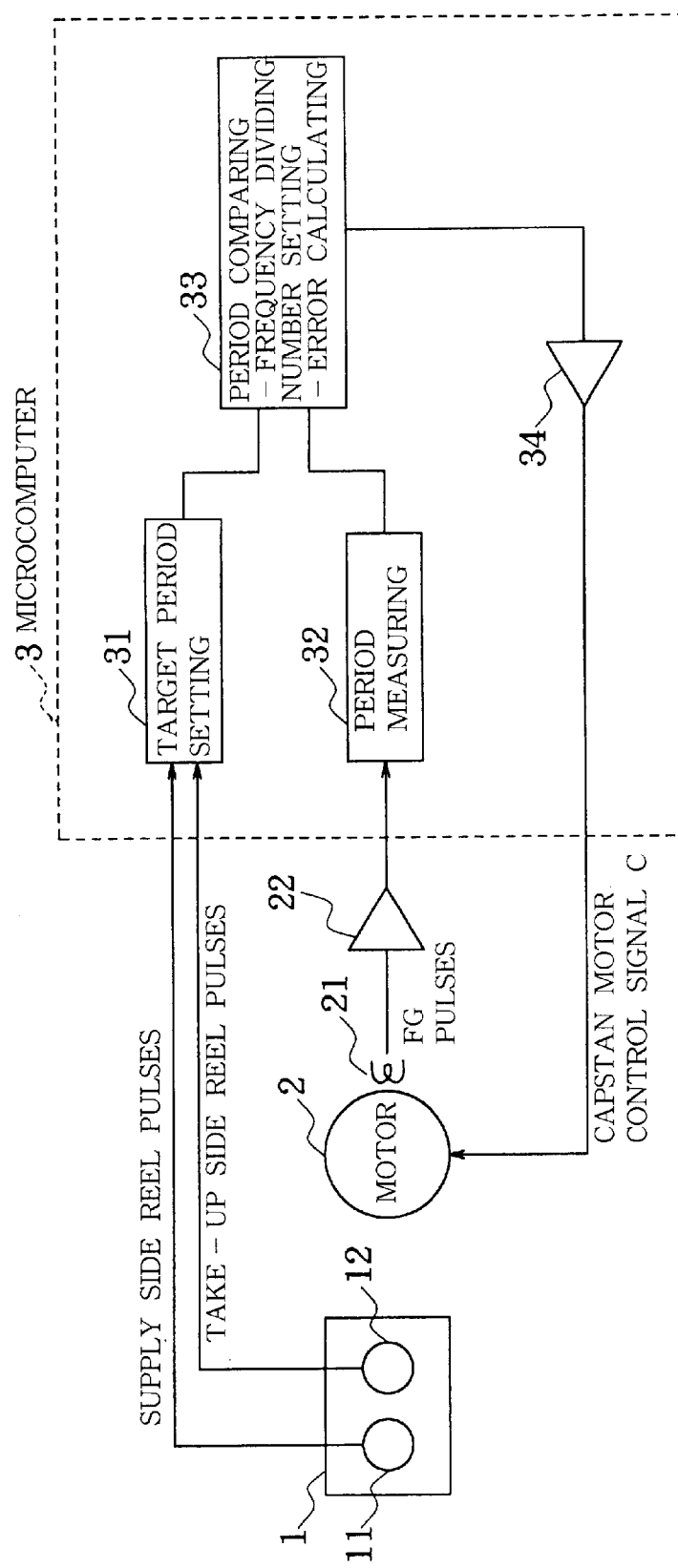
FIG. 1 is a block diagram showing the construction of a VTR embodying the present invention.
Figure 9:
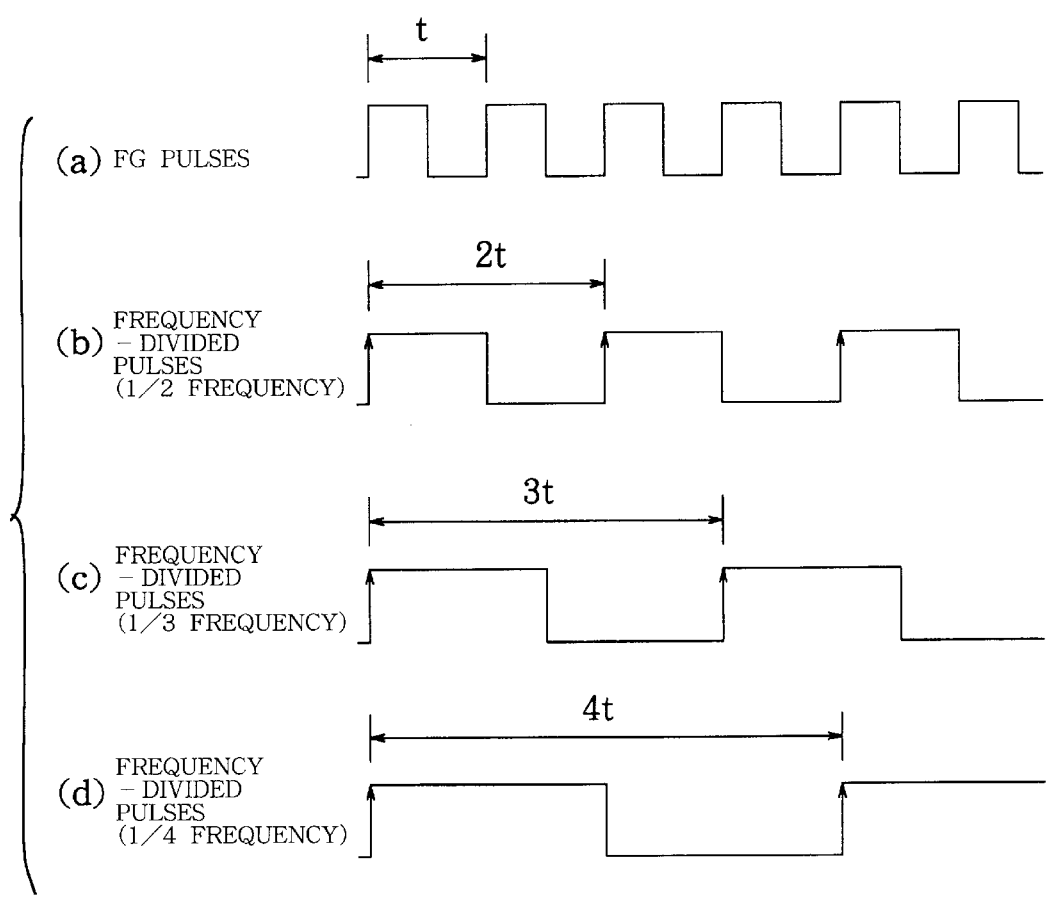
FIG. 9 includes waveform diagrams of FG pulses and frequency-divided pulses.

The present invention as embodied into a VTR will be described below in detail with reference to the drawings. As shown in FIG. 1, a VTR in the present invention has a supply reel support 11 and a take-up reel support 12 engageable with the two reels of a tape cassette 1. In the high-speed winding mode, the rotation of a capstan motor 2 is delivered to the reel support on the take-up side for paying off a magnetic tape from the reel on the supply side and winding the tape on the reel on the take-up side at a high speed. The capstan motor 2 is provided with a frequency generator 21, which produces FG pulses of predetermined period t timed with the rotation of the capstan motor 2 as shown in FIG. 9, (a). The capstan motor 2 is controlled with a control signal C fed from a microcomputer 3.

The supply reel support 11 and the take-up reel support 12 deliver supply reel pulses and take-up reel pulses, respectively, to target period setting means 31 of the microcomputer 3, whereby the target period to be described later is determined. The rotational period of each reel is measured based on the reel pulses concerned. The FG pulses obtained from the frequency generator 21 are fed via an amplifier 22 to frequency measuring means 32 of the microcomputer 3, whereby the period of frequency-divided pulses is measured.

The target period obtained from the target period setting means 31 and the measured period obtained from the period measuring means 32 are fed to period comparing-frequency dividing number setting-error calculating means 33, which compares the periods, determines a frequency dividing number and calculates the error involved. The calculated result is fed to an error amplifier 34 to prepare a control signal C for the capstan motor 2.

Figure 10:
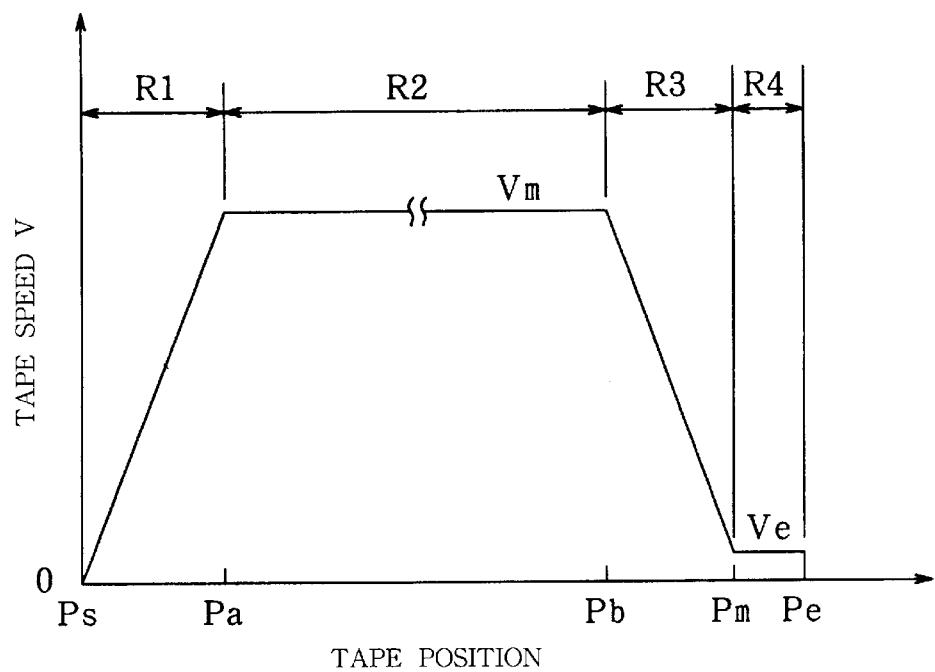
FIG. 10 is a graph showing variations in tape speed in the high-speed winding mode.
Figure 11:
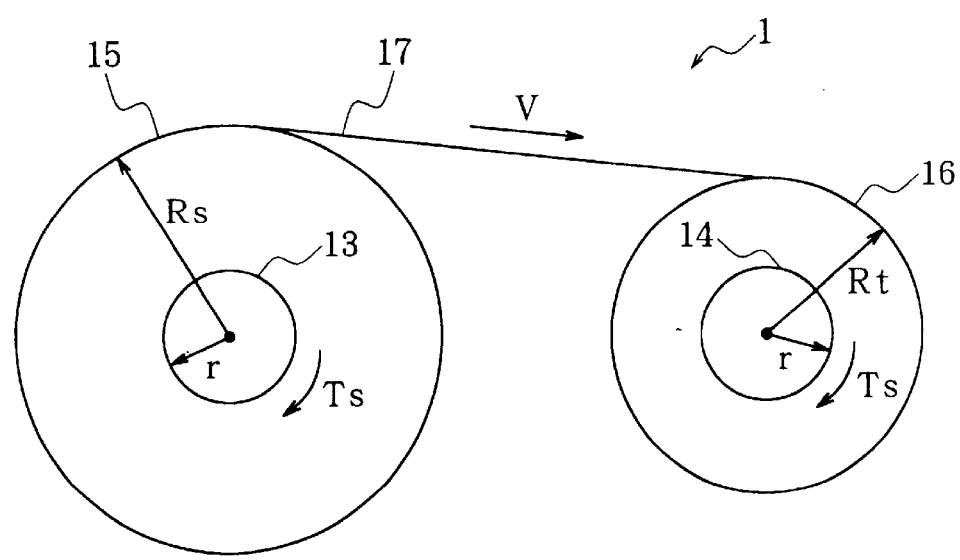
FIG. 11 is a diagram showing dimensions of a tape cassette.
Figure 12:
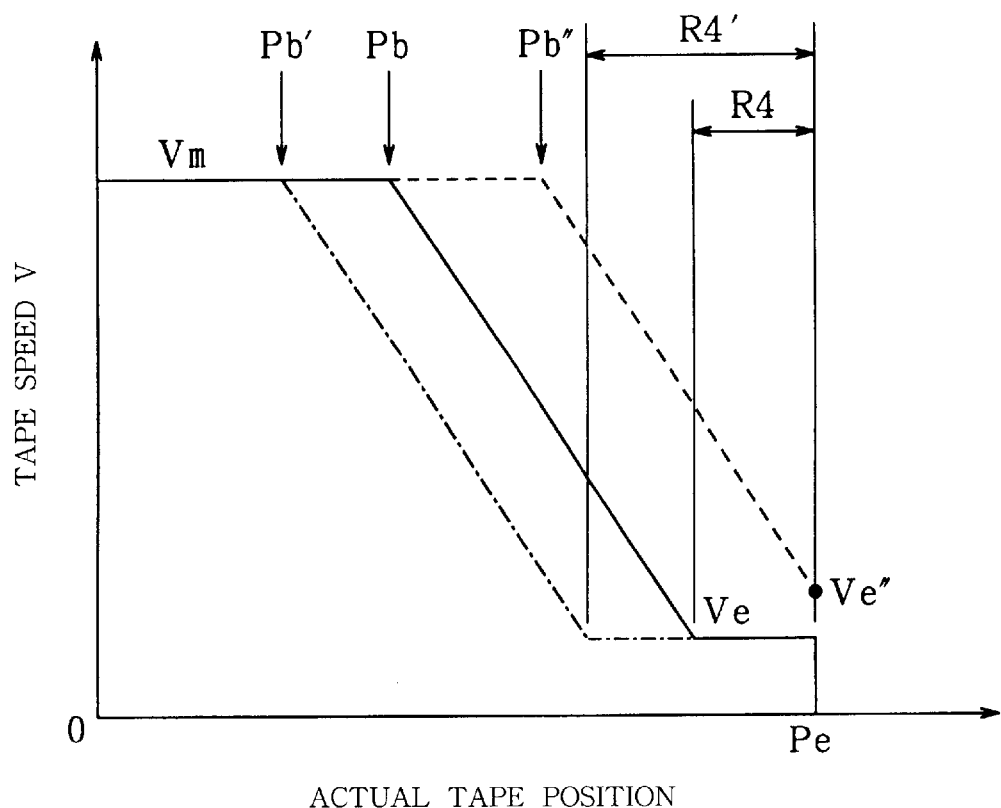
FIG. 12 is a graph for illustrating problems involved in a conventional mode of deceleration control.
Figure 13:
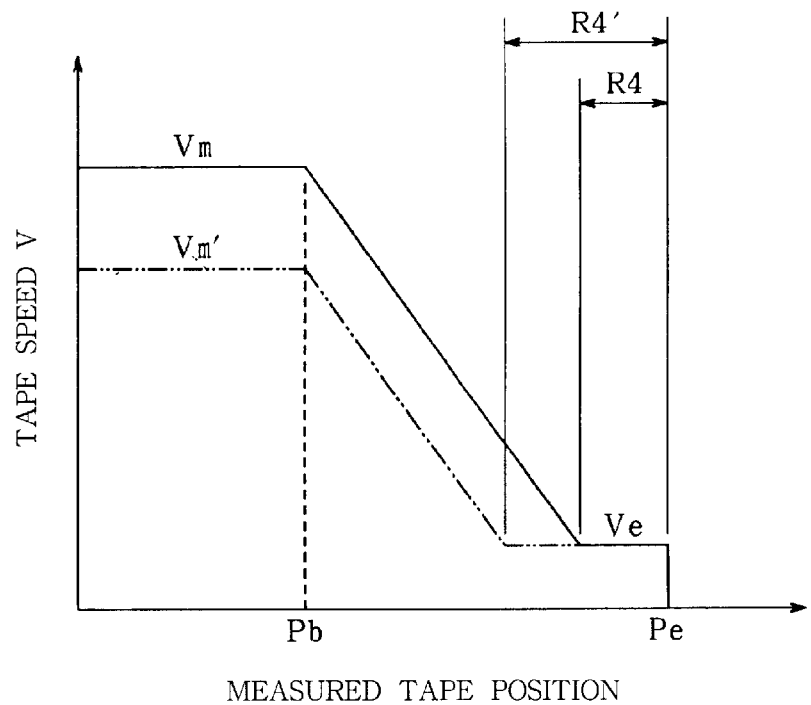
FIG. 13 is a graph for illustrating another problem involved in the conventional mode of deceleration control.

When the VTR described is set in the high-speed winding mode, speed variations are available which comprise an acceleration section R1, constant-speed section R2, deceleration section R3 and low-speed section R4 as shown in FIG. 10.

Figure 2:
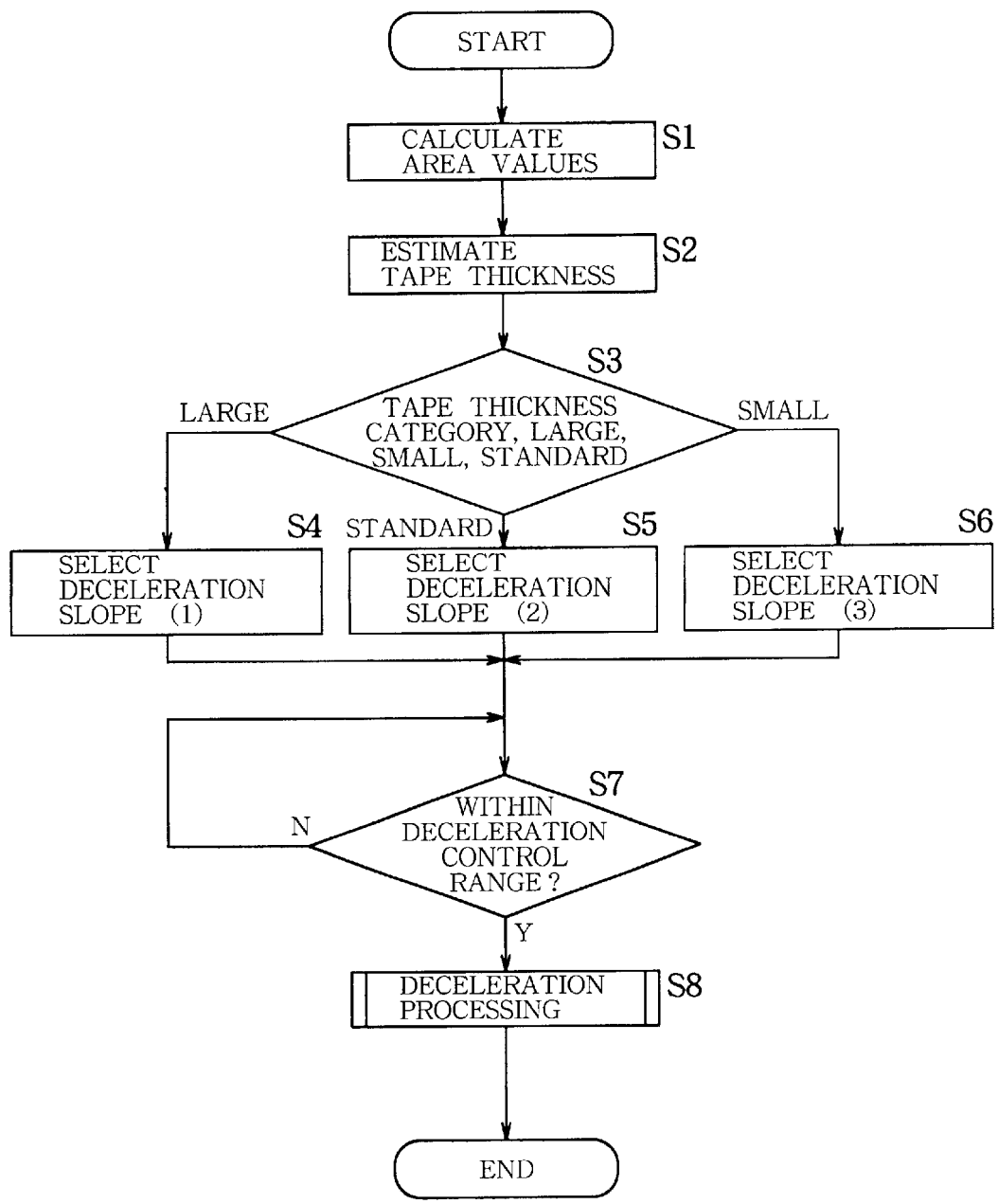
FIG. 2 is a flow chart showing a deceleration control procedure for use in the VTR of the present invention.

FIG. 2 shows the deceleration control procedure to be performed by the microcomputer 3.

Step S1 first calculates the area value Ss of the magnetic tape wound on the supply reel of the tape cassette and the area value St of the tape wound on the take-up reel of the cassette. The combined area (Ss+St) of the tape is divided by the entire length Q of the tape in step S2 to estimate the thickness of the tape. Subsequently in step S3, the estimated tape thickness is classified according to three categories, "large," "standard" and "small." The number of tape thickness categories is not limited to three but can be an at least four.

Figure 5:
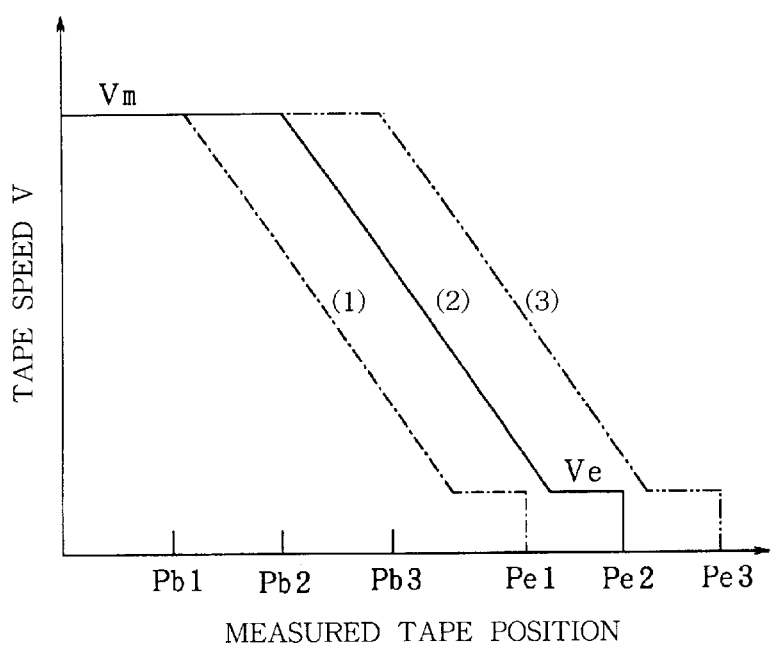
FIG. 5 is a graph showing a plurality of deceleration slopes.

When the tape thickness is "large," deceleration slope (1) shown in FIG. 5 is selected in step S4. When the tape thickness is "standard," deceleration slope (2) shown in FIG. 5 is selected in step S5. If the tape thickness is "small," deceleration slope (3) of FIG. 5 is selected in step S6. These deceleration slopes (1), (2), (3) are prescribed as representing the relationship between the measured tape position and the tape speed V as seen in FIG. 5, and are different as indicated at Pb1, Pb2, Pb3 in the tape position where deceleration is to be started from the tape speed Vm of the constant-speed section. However, these deceleration slopes are the same in the rate of variation of the speed. The deceleration starting positions of these slopes (1) to (3) can be theoretically determined as tape positions for setting the length of the tape to be wound by the deceleration movement and slow-speed movement at an optimum value, by taking into account an error involved in an estimated amount of the remaining tape for each of the different tape thicknesses.

After one deceleration slope is selected according to the tape thickness as described above, an inquiry is made in step S7 of FIG. 2 as to whether the tape position is within the deceleration control range provided by the deceleration slope. If the inquiry is answered in the affirmative, step S8 follows to execute deceleration processing based on the selected slope.

When the deceleration slope (1) is selected by the above control procedure for the tape which has a large thickness, the tape position (deceleration starting position) where the constant-speed movement is to be changed over to the deceleration movement is shifted toward the tape leading end, whereby the difference in the deceleration starting position due to an error in the estimated amount of remaining tape is corrected to set the tape length to be wound up by the low-speed movement to a predetermined value. Conversely, if the deceleration slope (3) is selected for the tape which has a small thickness, the deceleration starting position is shifted toward the tape trailing end, whereby a different in the deceleration starting position due to an error in the estimated amount of remaining tape is corrected to set the tape length to be wound up by the low-speed movement to the predetermined value.

Consequently, the tape starts to decelerate at a position a predetermined distance away from the tape winding end, i.e., the tape trailing end, the deceleration section and the slow-speed section are thereafter determined accurately, and the tape is wound up to the trailing end. According, in realizing the high-speed winding mode at a tape speed at least 500 times the playback speed, the lengths of the deceleration section and the low-speed section can be set to the shortest possible values, whereby the time required for winding up the tape can be shortened.

Figure 3:
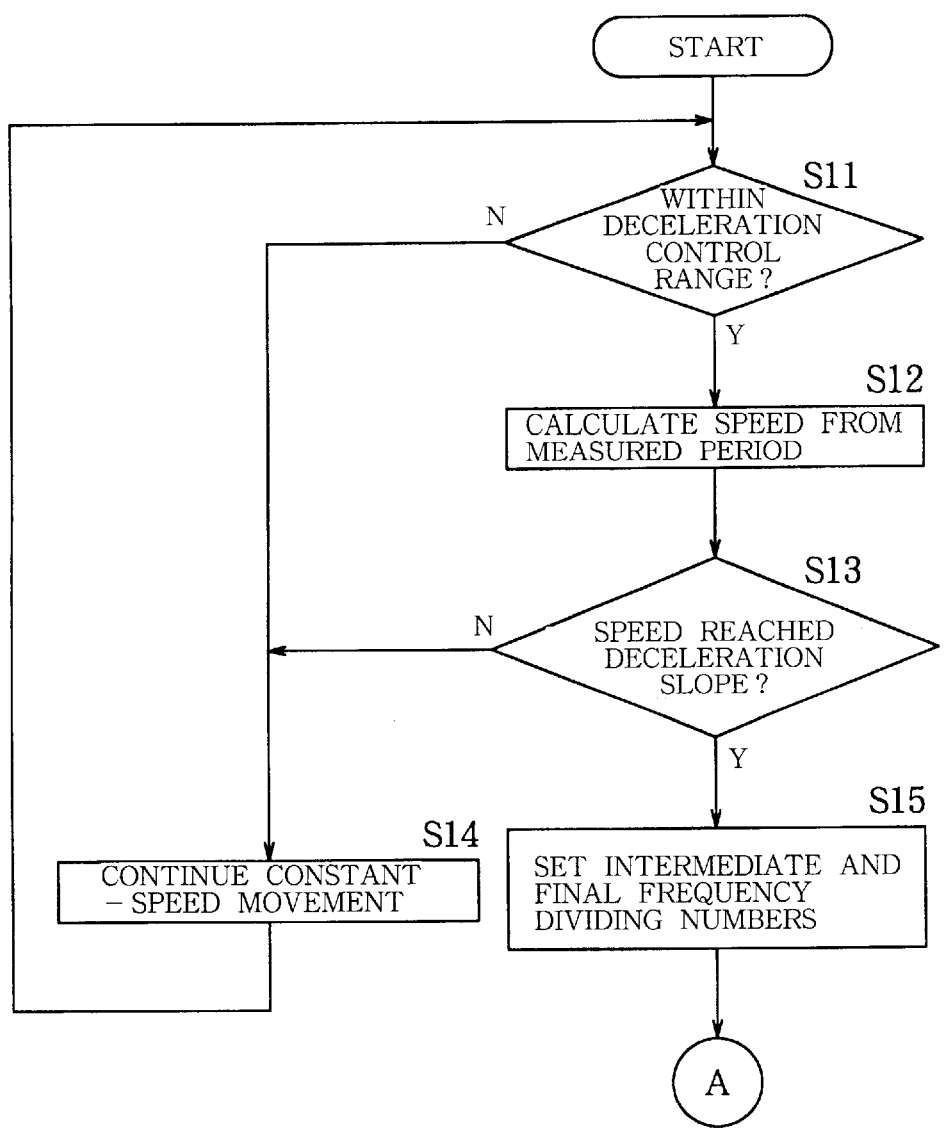
FIG. 3 is a flow chart showing the first half of a specific deceleration processing procedure included in the deceleration control procedure.
Figure 4:
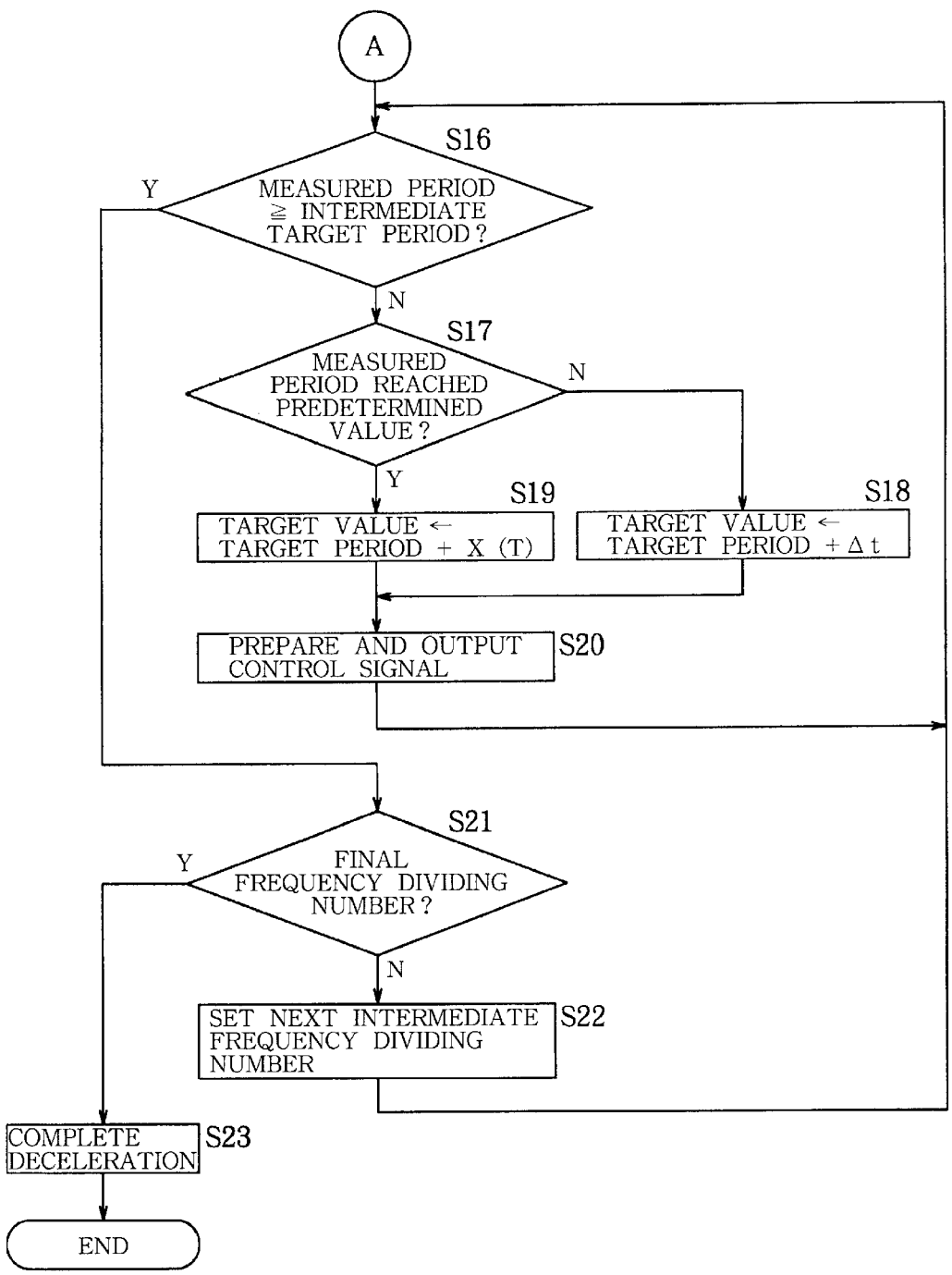
FIG. 4 is a flow chart showing the second half of the processing procedure.

FIGS. 3 and 4 show a specific control procedure for deceleration control. In controlling the tape speed by the microcomputer 3 according to the present embodiment, FG pulses obtained from the frequency generator 21 are frequency-divided with N to prepare frequency-divided pulses as shown in FIGS. 9, (b), (c), (d), and the control procedure of FIGS. 3 and 4 is executed by an interrupt timed with the rise of the frequency-divided pulse.

Speed control is executed by an interrupt timed with the rise of frequency-divided pulse also in the conventional mode of controlling VTRs. More specifically, in the course of deceleration from start to completion thereof, the frequency dividing number N is gradually decreased, and the rotational period of the capstan motor is increased by executing such control that the period of frequency-divided pulses provided by each frequency dividing number is made closer to a target period to lower the tape speed.

Figure 14:
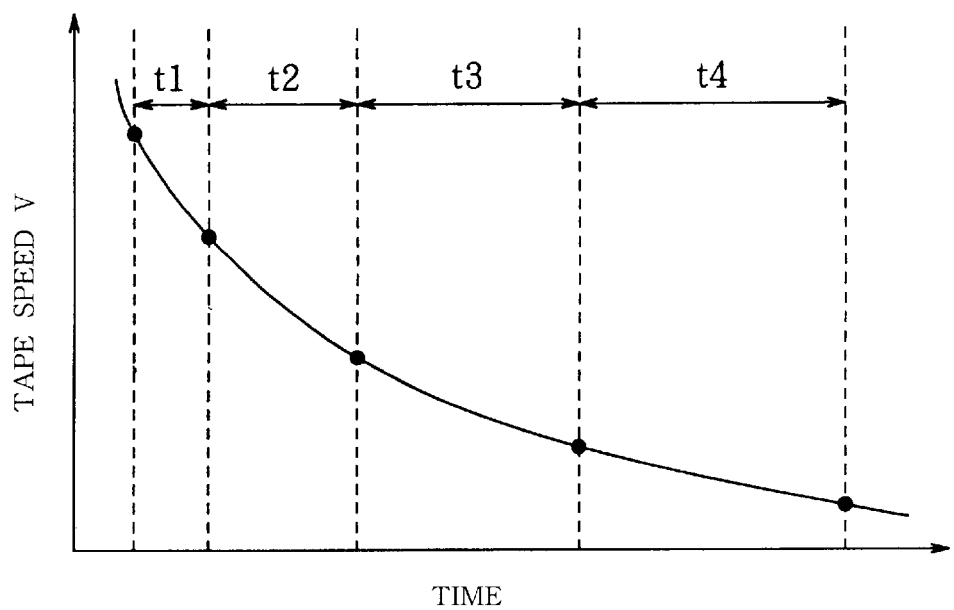
FIG. 14 is a graph showing variations in tape speed in the convention mode of deceleration control.

With the conventional VTR, however, the control procedure including the measurement of the period of frequency-divided pulses, setting of the target period of frequency-divided pulses and preparation of the motor control signal in accordance with the deviation of the period of frequency-divided pulses is performed by an interrupt as timed with the rise of frequency-divided pulse as described above, and the period of frequency-divided pulses is increased gradually by deceleration control, so that the control procedure is carried out not in a definite cycle but at a time interval which increases gradually (t1<t2<t3<t4 . . . ) as shown in FIG. 14. Consequently, the tape speed V varies with time not linearly but in a curve. In the case where the tape speed thus varies in a curve during deceleration, there arises the problem that the tape speed varies markedly to slacken the tape.

With the VTR embodying the invention, therefore, the procedure shown in FIGS. 3 and 4 and to be described below is used for controlling the tape speed in the deceleration section to uniformalize the rate of variation of the tape speed with time. First, step S11 of FIG. 3 inquires whether the current tape position has reached the range of deceleration control prescribed by the selected deceleration slope, based on the amount of remaining tape detected. If the inquiry is answered in the negative, step S14 follows to continue the constant-speed movement. When the inquiry of step S11 is thereafter answered in the affirmative, step S12 follows to calculate the tape speed from the measurement of rotational period of the capstan motor 2.

An inquiry is made subsequently in step S13 as to whether the tape speed has reached the deceleration slope. If the answer is negative, step S14 follows to continue the constant-speed movement. When the inquiry of step S13 is thereafter answered in the affirmative, the sequence proceeds to step S15 to set the intermediate frequency dividing numbers and the final frequency dividing number to be described below. The deceleration procedure shown in FIG. 4 then follows.

Figure 6:
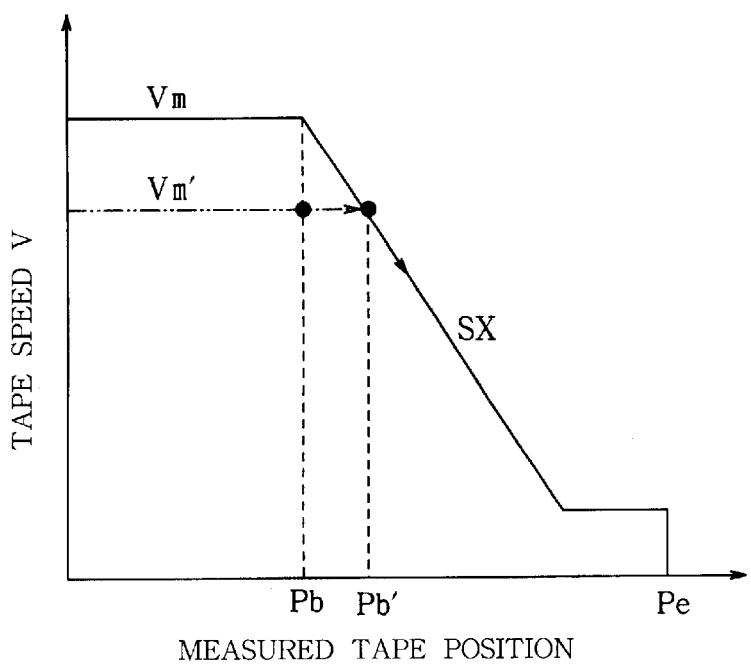
FIG. 6 is a graph for illustrating a speed control starting point in time based on the deceleration slope selected.

The procedure of FIG. 3, steps S11 to S15 is such that if the tape speed in the constant speed section is lower than the predetermined value Vm as indicated in a chain line in FIG. 6, deceleration is not started when the deceleration starting position Pb of the selected deceleration slope SX is reached, but the tape is held in constant-speed movement at the current tape speed Vm'. When the measured tape position prescribed by the slope SX is reached at this speed, speed control is started based on the slope SX. Accordingly, even if the tape speed is lowered by an increased load during the constant-speed movement, speed control is executed according to the selected deceleration slope SX at all times to shorten the tape winding time.

The deceleration control procedure shown in FIG. 4 provides a plurality of intermediate frequency dividing numbers Ni (i=1 to n–1) and a final frequency dividing number Nn in the course of deceleration from start to completion thereof. The rotational period of the capstan motor is increased to lower the tape speed by changing over these frequency dividing numbers from one to another in a gradually decreasing order and executing such control that the period of frequency-divided pulses is made closer to a target period with use of each frequency dividing number.

Figure 7:
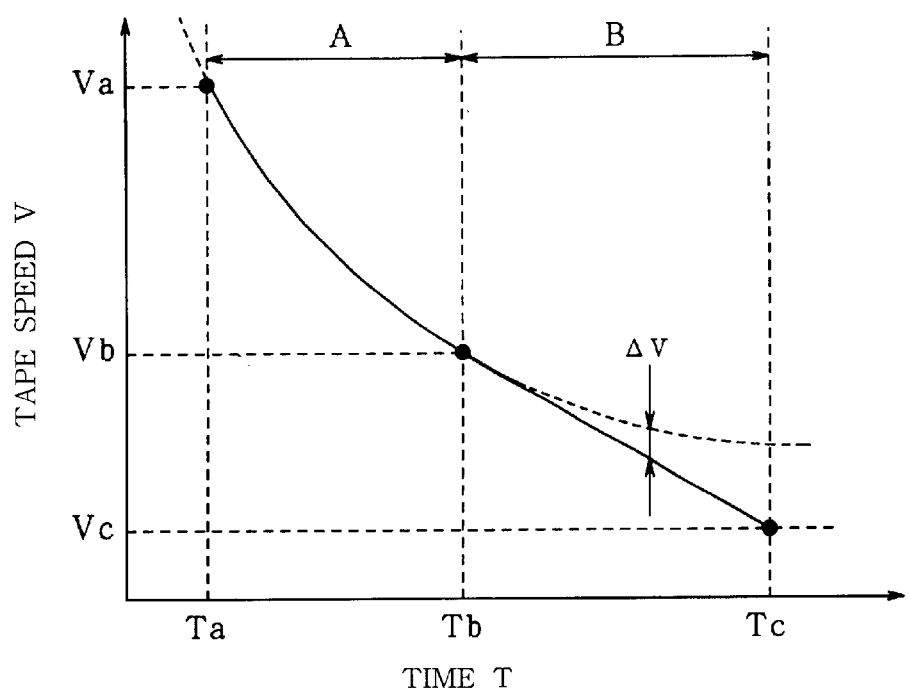
FIG. 7 is a graph showing the principle of deceleration control of the present invention.

FIG. 7 is a graph for illustrating the principle of the deceleration control for the VTR of the present embodiment. When the tape speed is to be lowered by executing control for increasing the period of frequency-divided pulses given by one frequency dividing number, the control procedure is conventionally performed by an interrupt as timed with the rise of frequency-divided pulse as previously stated, with the result that the tape speed V varies in a curve as indicated by a broken line in FIG. 7, whereas according to the present embodiment, the control of tape speed with one intermediate frequency dividing number is divided into two periods of time, i.e., first time period A and second time period B. During the first time period A, the same processing as in the prior art is executed, while during the second time period B, control is so effected as to increase the variation of tape speed by $\Delta V$ as indicated in a solid line in FIG. 7, whereby the rate of variation of the tape speed with time is made closer to a constant value as indicated by the solid line in FIG. 7. While changing over the intermediate frequency numbers from one to another, the above-mentioned control of the first period A and the second period B with use of each intermediate dividing number is repeated as shown in FIG. 8 to reduce the tape speed V to the low speed.

Figure 8:
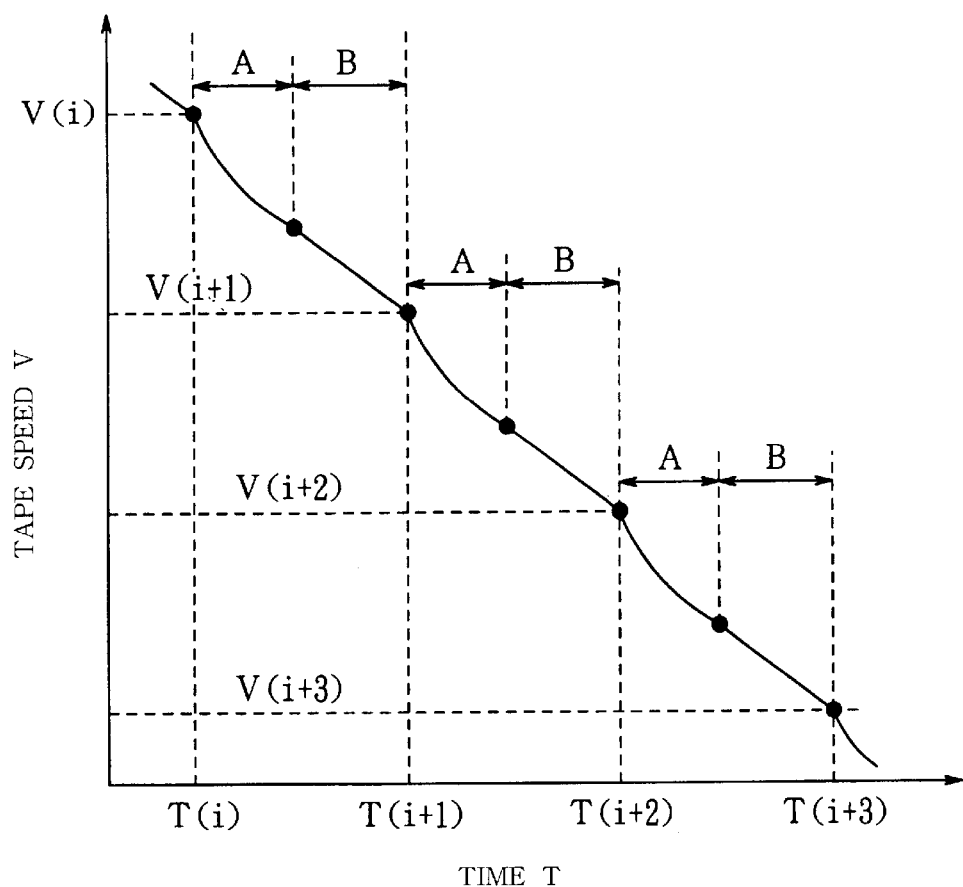
FIG. 8 is a graph showing variations in tape speed realized by the deceleration control of the invention.

Incidentally, at the intermediate frequency dividing number change-over points of time T(i), T(i+1), T(i+2), . . . shown in FIG. 8, the target values for the varying periods of frequency-divided pulses also need to be changed over from one to another in a gradually decreasing order in corresponding relation with the intermediate frequency dividing numbers in decreasing order. The pulse period target values corresponding to the respective intermediate frequency dividing numbers will be referred to as "intermediate target periods."

First in step S16 of FIG. 4, the measured period is compared with the first intermediate target period, and an inquiry is made as to whether the measured period is not smaller than the intermediate target period. If the answer is negative, step S17 follows to inquire whether the measured period has reached a predetermined value. The predetermined value for the measured period is determined as a tape speed Vb at which the deceleration control is to be changed over from the first half time period A to the second half time period B. Such a predetermined value is provided for each of all the intermediate target periods.

When the inquiry of step S17 of FIG. 4 is answered in the negative, that is, during the first half time period A, the target period of frequency-divided period is increased by a definite increment $\Delta t$, whereupon the sequence proceeds to step S20. A control signal in accordance with the deviation of the measured period from the target period is prepared and then fed to the capstan motor 2, followed by step S16 again to repeat the same control steps as above. In this way, the deceleration of the first half time period A shown in FIG. 7 is realized.

When the inquiry of FIG. 4, step S17 is thereafter answered in the affirmative, step S19 follows to increase the target period of frequency-divided pulses by a variation X(T) which is determined at the point of current time T. The variation X(T) is determined at every point of current time so as to make constant the rate of variation of the tape speed with time as shown in FIG. 7. Step S20 then follows, in which a control signal in accordance with the deviation of the measured period from the target period is prepared and then fed to the capstan motor 2. The sequence thereafter returns to step S16 to repeat the same mode of control as above. In this way, the deceleration of second half time period B shown in FIG. 7 is realized.

When the inquiry of FIG. 4, step S16 is thereafter answered in the affirmative, that is, when one of tape speeds V(i), V(i+1), V(i+2), . . . shown in FIG. 8 is attained, step S21 of FIG. 4 follows to inquire whether the current frequency dividing number is the final dividing number. If the answer to the inquiry is negative, step S22 follows to set the next intermediate frequency dividing number and change over the current frequency dividing number to the next one. The sequence thereafter returns to step S16 to repeat the same control steps as above. In this way, the tape speed is lowered along the curve of FIG. 8, with the intermediate frequency dividing numbers changed over from one to another in decreasing order.

Consequently, the frequency dividing number reaches the final dividing number, and the tape speed lowers to the low speed, whereupon the inquiry of FIG. 21, step S21 is answered in the affirmative, followed by step S23 to complete the deceleration operation.

According to the deceleration control procedure of FIGS. 3 and 4, the tape speed is altered with time nearly linearly as shown in FIG. 8 to shorten the time required for winding up the tape and prevent the tape from slackening. Further while decreasing the frequency dividing number during deceleration from start to termination thereof, the period of frequency-divided pulses is controlled with use of each frequency dividing number, so that the variations in the period of frequency-divided pulses given by each dividing number can be diminished. This simplifies the circuit construction and achieves an improved control accuracy.

The tape recorder of the present invention is not limited to the foregoing embodiment in construction but can be modified variously by one skilled in the art within the scope of the invention as set forth in the appended claims. For example, the deceleration slopes shown in FIG. 5 can be given alternatively by functional expressions wherein the measured tape position and the estimated tape thickness are variables.

What is claimed is:

1. A cassette tape recorder for recording signals on a magnetic tape wound on a pair of reels of a tape cassette or reproducing signals from the tape, the cassette tape recording including a tape transport mechanism for unwinding the tape from one of the reels and winding the tape on the other reel, and a control circuit for controlling the operation of the tape transport mechanism, the control circuit comprising:

remainder detecting means for detecting the amount of the tape remaining unwound and extending to a tape trailing end;

speed control means for controlling the speed of movement of the tape during rewind and fast-forward modes based on a tape position corresponding to the detected amount of the remaining tape to bring the tape into an accelerated movement, a constant-speed movement and a decelerated movement, successively; and estimating means for estimating the thickness of the tape, wherein the speed control means comprises deceleration starting position adjusting means for altering the tape position where the deceleration of the tape is to be started, in accordance with the estimated thickness of the tape.

2. A cassette tape recorder according to claim 1, wherein the remainder detecting means calculates the amount of the remaining tape from the area Ss of a region positioned between and defined by the radially innermost circle of the tape as wound on the reel on the supply side and the radially outermost circuit thereof, the area St of a region positioned between and defined by the radially innermost circle of the tape as wound on the reel on the take-up side and the radially outermost circle thereof and the overall length Q of the tape, wherein the tape thickness estimating means calculates the thickness of the tape by dividing the combined area (Ss+St) of the tape wound on the two reels by the overall length Q of the tape, and wherein the deceleration starting position adjusting means alters the deceleration starting position toward a leading end of the tape with an increase in the estimated thickness of the tape.

3. A cassette tape recorder according to claim 1, wherein the speed control means has a plurality of deceleration slopes which are different in deceleration starting position as speed varying reference curves prescribing the relationship between the tape position and the tape speed during deceleration, selects one of the deceleration slopes in accordance with the estimated thickness of the tape, and controls the tape speed based on the selected deceleration slope.

4. A cassette tape recorder according to claim 3, wherein the speed control means continues the constant-speed movement until the tape speed-position relationship prescribed y the selected deceleration slope is established before a change-over to the deceleration movement.

5. A cassette tape recorder according to claim 1, wherein the speed control means comprises frequency dividing means for frequency-dividing FG pulses in synchronism with the rotation of a motor constituting the tape transport mechanism by N, setting means for setting the frequency dividing number N, period measuring means for measuring the period of frequency-divided pulses obtained by the frequency division, target period setting means for setting target values in succession for respective periods of frequency-divided pulses, and motor control means for preparing a control signal for the motor based on the deviation of the period measurement of frequency-divided pulses from the target value, the target period setting means being operable to alter an increase in the target period within a predetermined range of periods of frequency-divided pulses to thereby make uniform the rate of variation with time of the tape speed during the deceleration movement, every time processing is performed for setting the target period and preparing the control signal.

6. A cassette tape recorder according to claim 5, wherein the frequency number setting means successively decreases the frequency dividing number N to determine one or a plurality of intermediate frequency dividing numbers and one final frequency dividing number, and frequency-divides the FG pulses by each intermediate frequency dividing number until the number reaches the final frequency dividing number, the period measuring means, the target period setting means and the motor control means being operable to execute the foregoing control at each intermediate frequency dividing number.

* * * * *